US012135447B2

(12) United States Patent
Woods

(10) Patent No.: US 12,135,447 B2
(45) Date of Patent: *Nov. 5, 2024

(54) LED ILLUMINATED WAVEGUIDE PROJECTOR DISPLAY

(71) Applicant: Snap Inc., Santa Monica, CA (US)

(72) Inventor: David Woods, Chinnor (GB)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/344,281

(22) Filed: Jun. 29, 2023

(65) Prior Publication Data

US 2023/0341603 A1   Oct. 26, 2023

Related U.S. Application Data

(63) Continuation of application No. 17/755,855, filed as application No. PCT/GB2020/052600 on Oct. 15, 2020.

(30) Foreign Application Priority Data

Nov. 11, 2019  (GB) ...................................... 1916369

(51) Int. Cl.
*F21V 8/00* (2006.01)
*G02B 3/00* (2006.01)
(52) U.S. Cl.
CPC ......... *G02B 6/0018* (2013.01); *G02B 3/0056* (2013.01); *G02B 6/0028* (2013.01)
(58) Field of Classification Search
CPC .. G02B 6/0018; G02B 3/0056; G02B 6/0028; G02B 6/0076; G02B 19/0061; G02B 27/0172
See application file for complete search history.

(56) References Cited

U.S. PATENT DOCUMENTS

| 11,747,538 B2 | 9/2023 | Woods | |
| 2006/0132914 A1* | 6/2006 | Weiss | G02B 30/40 |
| | | | 359/462 |

(Continued)

FOREIGN PATENT DOCUMENTS

| CN | 109901298 A | 6/2019 |
| CN | 110231714 A | 9/2019 |

(Continued)

OTHER PUBLICATIONS

"U.S. Appl. No. 17/755,855, Corrected Notice of Allowability mailed Apr. 21, 2023", 2 pgs.

(Continued)

*Primary Examiner* — Donald L Raleigh
(74) *Attorney, Agent, or Firm* — Schwegman Lundberg & Woessner, P.A.

(57) ABSTRACT

There is provided a projection display, and a method for illuminating a projection display. The projection display comprising a waveguide comprising an input grating having a plurality of linear diffractive features, the input grating configured to couple in light into the waveguide, and an array of LEDs configured to form an illumination pupil which is optically relayed as an input pupil onto the input grating, such that at the input grating the input pupil has a shape that is larger in a direction parallel to the linear diffractive features than in a direction perpendicular to the linear diffractive features.

20 Claims, 10 Drawing Sheets

(56) References Cited

U.S. PATENT DOCUMENTS

| | | |
|---|---|---|
| 2011/0242661 A1 | 10/2011 | Simmonds |
| 2017/0299860 A1 | 10/2017 | Wall et al. |
| 2018/0231771 A1 | 8/2018 | Schuck, III et al. |
| 2019/0278076 A1 | 9/2019 | Chen et al. |
| 2021/0088798 A1* | 3/2021 | Blomstedt ............ G02B 6/0026 |
| 2022/0397716 A1 | 12/2022 | Woods |

FOREIGN PATENT DOCUMENTS

| | | |
|---|---|---|
| CN | 213903958 | 8/2021 |
| EP | 1942364 A1 | 7/2008 |
| EP | 2945002 A1 | 11/2015 |
| JP | H08316125 A | 11/1996 |
| WO | WO-2021094706 A1 | 5/2021 |

OTHER PUBLICATIONS

"U.S. Appl. No. 17/755,855, Notice of Allowance mailed Apr. 17, 2023", 9 pgs.

"English Machine Translation of Japanese Pub. No. JPH08316125A", (2023), 15 pgs.

"European Application Serial No. 20793785.5, Communication pursuant to Rules 161(1) and 162 EPC mailed Jun. 22, 2022", 3 pgs.

"International Application Serial No. PCT/GB2020/052600, International Preliminary Report on Patentability mailed May 27, 2022", 9 pgs.

"International Application Serial No. PCT/GB2020/052600, International Search Report mailed Dec. 15, 2020", 5 pgs.

"International Application Serial No. PCT/GB2020/052600, Written Opinion mailed Dec. 15, 2020", 7 pgs.

"Chinese Application Serial No. 202080077795.X, Office Action mailed Jan. 13, 2024", w/ English Translation, 12 pgs.

"International Application Serial No. PCT/GB2020/052600, International Preliminary Report on Patentability mailed Dec. 15, 2020", 9 pgs.

"European Application Serial No. 20793785.5, Indication of deficiencies in a request pursuant to Rule 22 EPC mailed Aug. 11, 2022", 2 pgs.

* cited by examiner

LED ILLUMINATED WAVEGUIDE PROJECTOR DISPLAY

CLAIM OF PRIORITY

This application is a continuation of U.S. patent application Ser. No. 17/755,855, filed on May 10, 2022, which is a U.S. national-phase application filed under 35 U.S.C. § 371 from International Application Serial No. PCT/GB2020/052600, filed on Oct. 15, 2020, and published as WO 2021/094706 on May 20, 2021, which claims the benefit of priority to United Kingdom Application Serial No. 1916369.0, filed on Nov. 11, 2019, each of which are incorporated herein by reference in their entireties.

FIELD

The present invention relates to projector displays comprising an illuminator and a waveguide.

BACKGROUND

The use of diffractive waveguides for imaging displays is well known. Imaging displays of this type can be subject to a number of issues that result in undesirable effects arising in the output image. In addition, it is desirable to improve the efficiency of these systems.

FIG. 1 shows a prior art projection display 100 that utilises a diffractive waveguide 2. The waveguide 2 has an input grating 4 and an output grating 10 spaced apart from the input grating 4. The input grating has a plurality of linear diffractive features 6.

When in use, a projector (not shown) projects light onto the input grating 4 to form an input pupil 8. The input pupil 8 is circular in shape. The input grating 4 diffracts the light of the input pupil 8 towards the output grating 10 through a series of total internal reflections within the waveguide 2. At the output grating 10 the input pupil 8 is replicated as a series of output pupils 12. At each interaction of the light with the output grating 10 some of the light is diffracted out of the waveguide as an output pupil replication 12 forming the image. The rest of the light continues to form further diffractions with the output grating 10 forming further output pupils 12.

The size of the input grating 4 is typically optimised to maximise the efficiency of the in-coupled light. This ensures that the maximum amount of light is incident on the input grating 4 such that it is not lost. However, if the input pupil is too large the undesirable effect of reinteraction may occur. This is where the diffracted light re-interacts with the input grating 4 after its initial diffraction by the input grating 4.

Reinteraction is shown in FIG. 2A, which shows a side on view of the waveguide 2 of FIG. 1. As can be seen, after its initial diffraction by the input grating 4 the light experiences a single total internal reflection before again being incident on the face of the waveguide on which the input grating 4 is located. As the shortest ray walk 14 is shorter than the length 16 of the input grating 4 between interactions the light reinteracts with the input grating 4 as shown in point 15. This results in a loss of efficiency as some of this reinteracted light is lost.

FIG. 2B shows a waveguide 2 where the shortest ray walk 14 is longer than the distance between the first point of interaction with the input grating 4 and the end of the input grating 4. Thus, no interaction occurs.

The length of the shortest ray walk 14 is dependent on the width of the waveguide 18. Clearly the thicker the waveguide 2 the longer the shortest ray walk, as the light has to travel in the waveguide 2 further before it is reflected off the face of the waveguide. This means less chance of reinteraction occurring for the same size input grating 4. However, for many applications it is desirable to have thin waveguides 2 for efficiency purposes and/or for manufacturing requirements.

Simply reducing the size of the input pupil is one option for reducing re-interaction. As for a smaller pupil the length of the input grating can be reduced. However, if pupils are too small undesirable gaps in the output image can occur causing a "banding" effect. In addition, chromatic dispersion in the direction perpendicular to the linear diffractive features always results in some broadening of the input pupil in this dimension.

Thus, it is desirable to address the issue of reinteraction particularly for waveguides where it is not possible to reduce their thickness, whilst also ensuring banding is avoided.

SUMMARY OF INVENTION

According to an aspect of the invention, there is provided a projection display comprising: a waveguide comprising an input grating having a plurality of linear diffractive features, the input grating configured to couple in light into the waveguide; and an array of LEDs configured to form an illumination pupil which is optically relayed as an input pupil onto the input grating, such that at the input grating the input pupil has a shape that is larger in a direction parallel to the linear diffractive features than in a direction perpendicular to the linear diffractive features.

Forming an input pupil with a shape larger in a direction parallel to the linear diffractive features of the input grating rather than perpendicular to the linear diffractive features helps to avoid re-interaction. This is owing to the fact that a small input pupil in the dimension perpendicular to the linear diffractive features reduces the chance of reinteraction.

Reinteraction is not a problem in the dimension parallel to the linear diffractive features. Thus, having an input pupil that is larger in the direction parallel to the linear diffractive features enables the overall size of the input pupil to be larger without experiencing reinteraction. It is desirable to have a large pupil, as if the pupil is too small it can cause banding in the output image. Maximising the size of the input pupil in the direction parallel to the linear diffractive features increases the overall size of the input pupil. This reduces banding, but not at the expense of experiencing reinteraction.

The projection display may further comprise a tapered light pipe array, positioned between the array of LEDs and the remainder of the projector optics, wherein the tapered light pipe array is configured to receive light from the array of LEDs before being optically relayed as the input pupil on the input grating.

In this way, light emitted from each of the LEDs is efficiently collected into a corresponding tapered light pipe. The light pipes act as a conduit to expand the light beams in two dimensions (2D) whilst reducing the angle of emittance of the light, i.e. the numerical aperture of the light is reduced. The light has a larger area but is emitting over a much smaller range of angles at the exit aperture at the second end of the tapered light pipes, than the light incident on the first end of the light pipe from the LEDs.

The reduction in angular range allows any subsequent lenses to relay an image of the exit aperture of the light pipe to the waveguide with greater efficiency and precision than without a light pipe. Such an efficient optical arrangement is normally unacceptably large for compact projectors.

Preferably, each LED of the array of LEDs has a respective tapered light pipe.

As each LED has a corresponding tapered light pipe the array of tapered light pipes are preferably arranged in the same pattern as the arrangement of the LED array. The tapering of the light pipes is achieved through having the first end, where light is received from the LED, smaller than the second end from which the light is emitted. The tapered light pipe also expands the beam of light transmitted from the LED. In some cases this expansion may be an increase in width of the beam of x3, this corresponds to an x9 expansion of the area of the light incident on the first end of the tapered light pipe compared to the light emitted from the second end of said light pipe. However, in other embodiments the expansion may be any increase in beam width, for instance x2, x4, x5.

The end of each tapered light pipes may have a shape that is the same as the shape of the input pupil. The shape of the input pupil at the waveguide may be formed by the shape of the tapered light pipe. The light transmitted from the LEDs upon entering the tapered light pipe may not have the desired shape. The tapered light pipe may ensure that the light has a shape that is larger in a direction parallel to the linear diffractive features than in a direction perpendicular to the linear diffractive features of the input grating. For instance, the aspect ratio of the end of the tapered light pipes is preferably 16:9. Alternatively, the aspect ratio could be any of 5:4, 4:3, and 16:10. In addition, the shape of both ends of each of the tapered light pipes may also be shaped to match the input pupil.

Alternatively, in other embodiments the shape of either end of the light pipe may differ from the shape of the input pupil. In these embodiments an optical component may be provided between the second end of the light pipe (closest to the waveguide) and the waveguide to form the shape of the input pupil.

Alternatively, or in addition, the array of LEDs may be arranged on a 2D surface, wherein the shape of the spatial arrangement of the array of LEDs is the same as the shape of the input pupil. For instance, the array of LEDs may have any of the aspect ratios as discussed above. The array of LEDs may be arranged in an elliptical shape. Alternatively, they may be arranged in an elliptical shape. By arranging the array of LEDs in an elliptical arrangement the illumination pupil from the array of LEDs will be of the shape of the input pupil. Alternatively, other means may be provided to create the shape of the input pupil.

Preferably, the waveguide has a width and the input grating has a length, and the input pupil's size is selected dependent on the width of the waveguide and the length of the input grating, such that the light only has a single interaction with the input grating. This ensures that the input pupil is small enough such that it does not cause reinteraction with the input grating. Thus, the light does not interact with the input grating once it has been diffracted and totally internally reflected. In this arrangement the width of the input grating is defined as being perpendicular to the length of the input grating. The shortest ray walk is defined as the distance between the first interaction of the light with the input grating and the subsequent interaction of the light with the waveguide after a single total internal reflection has occurred. The shortest ray walk is determined by the width of the waveguide. A thicker waveguide provides a larger shortest ray walk than a thinner waveguide. This is because in a thicker waveguide the light has further to travel before interacting with the waveguide. In many cases it may be desirable to make the width of the waveguide thin or have a certain thickness. This may be due to design constraints or to improve performance. However, a thinner waveguide requires a smaller input pupil in the direction perpendicular to the linear diffractive features of the input grating to avoid re-interaction.

The projection display may comprise a plurality of arrays of LEDs, each array of LEDs emitting light of a specific colour. In this way, input pupils of specific colours can be created at the input grating. The colours of the LEDs may be red, green and blue. Alternatively, they may be red, yellow and blue. Each array of LEDs may emit at a specific wavelength or range of wavelengths. Each array of LEDs may emit light of a different colour to each of the other array of LEDs.

The array of LEDs may be of different colours distributed throughout the array of LEDs. This removes the need for a dichroic combiner to combine light of different colours. The colours of the LEDs may be red, green and blue (RGB). In some embodiments, the different colours of LEDs may be arranged in a repeating pattern. In other embodiments, the LEDs of different colours may be distributed randomly across the array. The LED array may contain the same number of LEDs of each colour. Alternatively, where the LEDs are micro LEDs there may be more green LEDs owing to the greater efficiency of green micro LEDs.

Preferably, the waveguide is a plurality of waveguides, the input grating of each waveguide configured to couple in light of a different colour to the input gratings of each of the other waveguides. By having a stack of waveguides each waveguide may be arranged to transmit light of a specific colour. The input grating of each waveguide may be specifically configured to couple in only a single colour of light. Alternatively, each waveguide may couple in multiple colours.

The plurality of arrays of LEDs may be arranged on a 2D surface, each array of LEDs offset from each other array of LEDs on said 2D surface. The surface may be a printed circuit board, or any type of surface known to the skilled person.

The array of LEDs may be arranged on the 2D surface in a pattern of rows of LEDs in a first axis, and columns of LEDs in a second axis. In this way the LEDs are arranged across the 2D surface. This may be in an ordered pattern. Alternatively, the LEDs may be arranged randomly across the 2D surface.

Preferably, each row of LEDs in the LED array is offset with respect to its adjacent rows of LEDs. Each column may also be offset with respect to its adjacent columns. In other words, each row is out of phase from its two nearest rows. In some embodiments this may be 90° out of phase.

In some embodiments, the array of LEDs may be arranged in a hexagonal packing format. Advantageously, this hexagonal packing, or honeycomb structure, enables the closest packing of the LEDs in the smallest amount of space. This provides the largest density of LEDs in the smallest area, maximising the useful LED area and so enhancing the efficiency of the projection display.

Preferably, the input grating of each waveguide is offset from the input gratings of each of the other waveguides, such that only light of a single colour is incident on each input grating.

The position of each of the input gratings may be offset by the same amount as the corresponding array of LEDs of that colour. In this way, each of the input gratings arranged to receive a particular colour of light is offset such that it is aligned with the array of LEDs of that colour. This means that light of a single colour is incident on each input grating. This improves efficiency as light is not lost through unwanted interactions with input gratings that are not configured to couple in that colour of light. The input gratings may be offset in a direction perpendicular to the width of the waveguide. Alternatively, or in addition, they may be offset in a direction parallel to the width of the waveguide.

Preferably, the plurality of waveguides comprise a first waveguide, a second waveguide and a third waveguide, the input grating of the first waveguide configured to couple in red light, the input grating of the second waveguide configured to couple in blue light, and the input grating of the third waveguide configured to couple in green light. Alternatively, the plurality of waveguides may be two waveguides. Alternatively, they may be configured to couple in other colours. For instance, red, yellow and blue.

The shape of the input pupil may be elliptical or rectangular. An input pupil having this shape avoids reinteraction whilst reducing banding. It also provides improved overlaps of the replications of the input pupil in the output grating.

Preferably, the waveguide further comprises an output grating, the output grating configured to receive light from the input grating and replicate the input pupil multiple times, to form an exit pupil coupling the light out of the waveguide.

The array of LEDs may be an array of microLEDs. By using micro LEDs coupled with a microlens array or array of micro tapered pipes, the size of the collection optics can be reduced. The efficiency of the device is also improved compared to other types of light sources or conventional LEDs. LEDs are Lambertian emitters i.e. they emit light over a wide range of angles, typically $2\pi$ steradians. MicroLEDs, when coupled with a microlens or micro-taper array are not Lambertian emitters and emit over a much smaller range of angles, resulting in less light lost. The device can provide double to triple the lumens per watt compared to light engines using currently known compact illuminator designs.

Preferably the linear diffractive features are grooves. Alternatively, they may be volume holograms or any other type of linear diffractive grating.

Preferably, the projection display further comprises a liquid crystal on silicon, LCOS, display positioned between the array of LEDs and the waveguide. The LCOS display may be positioned in the light path between the array of LEDs and the input grating of the waveguide. The LCOS display may form an image with the light incident on it from the LEDs. The image may then be projected as the input pupil onto the input grating of the waveguide. Alternatively, any other type of image generating means may be used. The display may be any type of non-self-emissive display, including transmissive liquid crystal display, reflective liquid crystal display, digital light processing displays, or dynamic mirror arrays.

The illuminator pupil may be formed on the projector optics that relay an image of the illumination pupil on or near to the input grating. This relayed image may form the input pupil.

According to a further aspect there is provided an augmented reality (AR), or virtual reality (VR) device, comprising the projection display of the above aspect. Preferably, the AR or VR device is an AR or VR headset.

According to a further aspect there is provided a method of illuminating a projection display comprising: emitting light from an array of LEDs to form an illumination pupil; optically relaying the illumination pupil as an input pupil onto an input grating of a waveguide to couple the light into the waveguide, such that at the input grating the input pupil has a shape that is larger in a direction parallel to the linear diffractive features of the waveguide than in a direction perpendicular to the linear diffractive features of the waveguide; and projecting the light out of the waveguide to form an image.

DETAILED DESCRIPTION

Figure 3A:
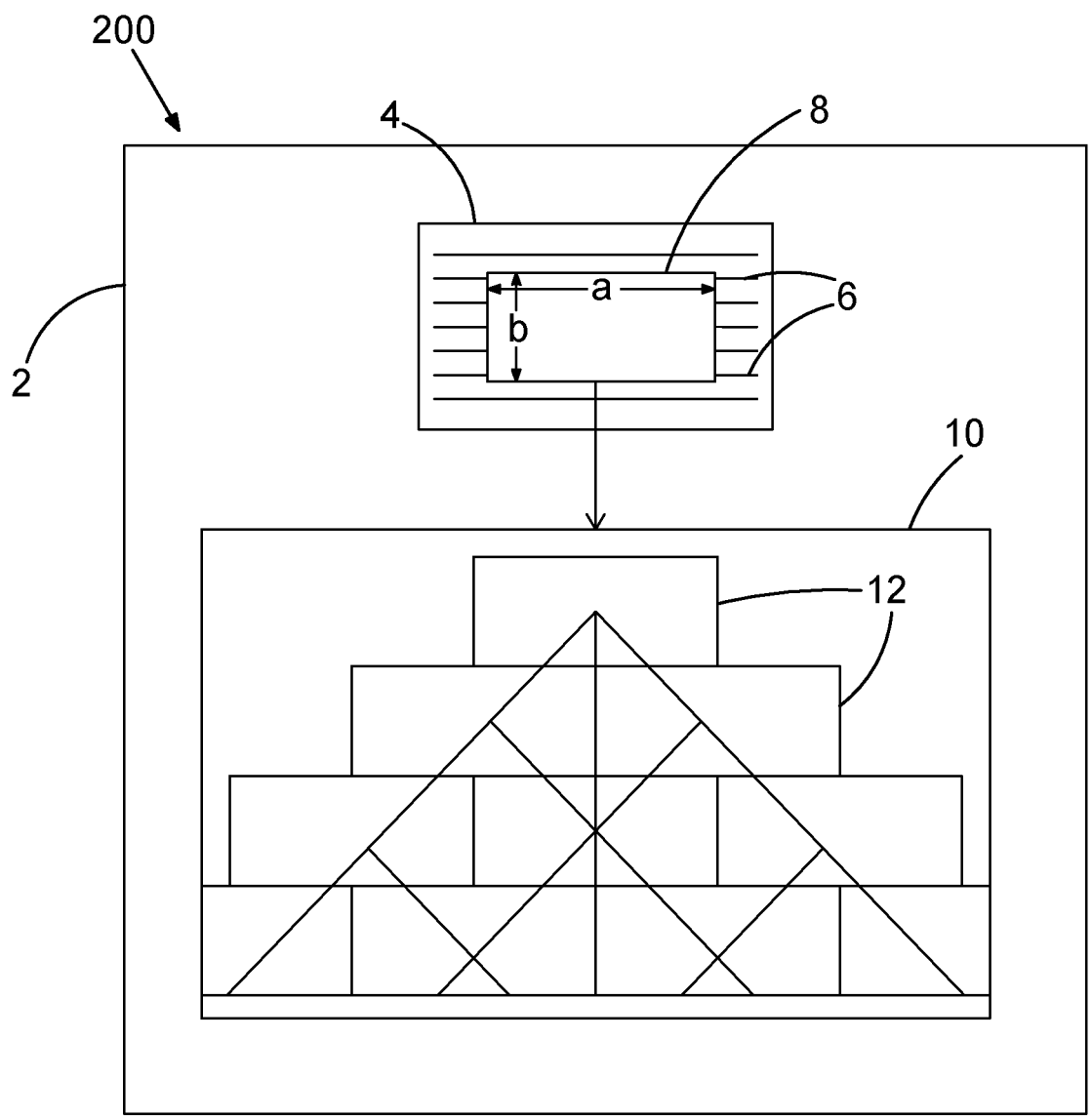
FIG. 3A is a schematic face-on view of a waveguide projection display according to an embodiment of the invention.

FIG. 3A is a schematic face-on view of a waveguide projection display 200 according to an embodiment of the invention. The waveguide projection display 200 includes a waveguide 2 and an illuminator (not shown due to the orientation of the Figure). The illuminator is in the form of an array of LEDs.

The waveguide 2 has an input grating 4 and an output grating 10. The output grating is spaced apart from the input grating 4. The input grating 4 has a plurality of linear diffractive features 6. The linear diffractive features 6 are for diffracting the light incident on input grating 4. The linear diffractive features extend in a first direction that is perpendicular to the path that the light takes once it has diffracted off the input grating. This is known as the across track direction. The along track direction is defined as perpendicular to the linear diffractive features.

Figure 1:
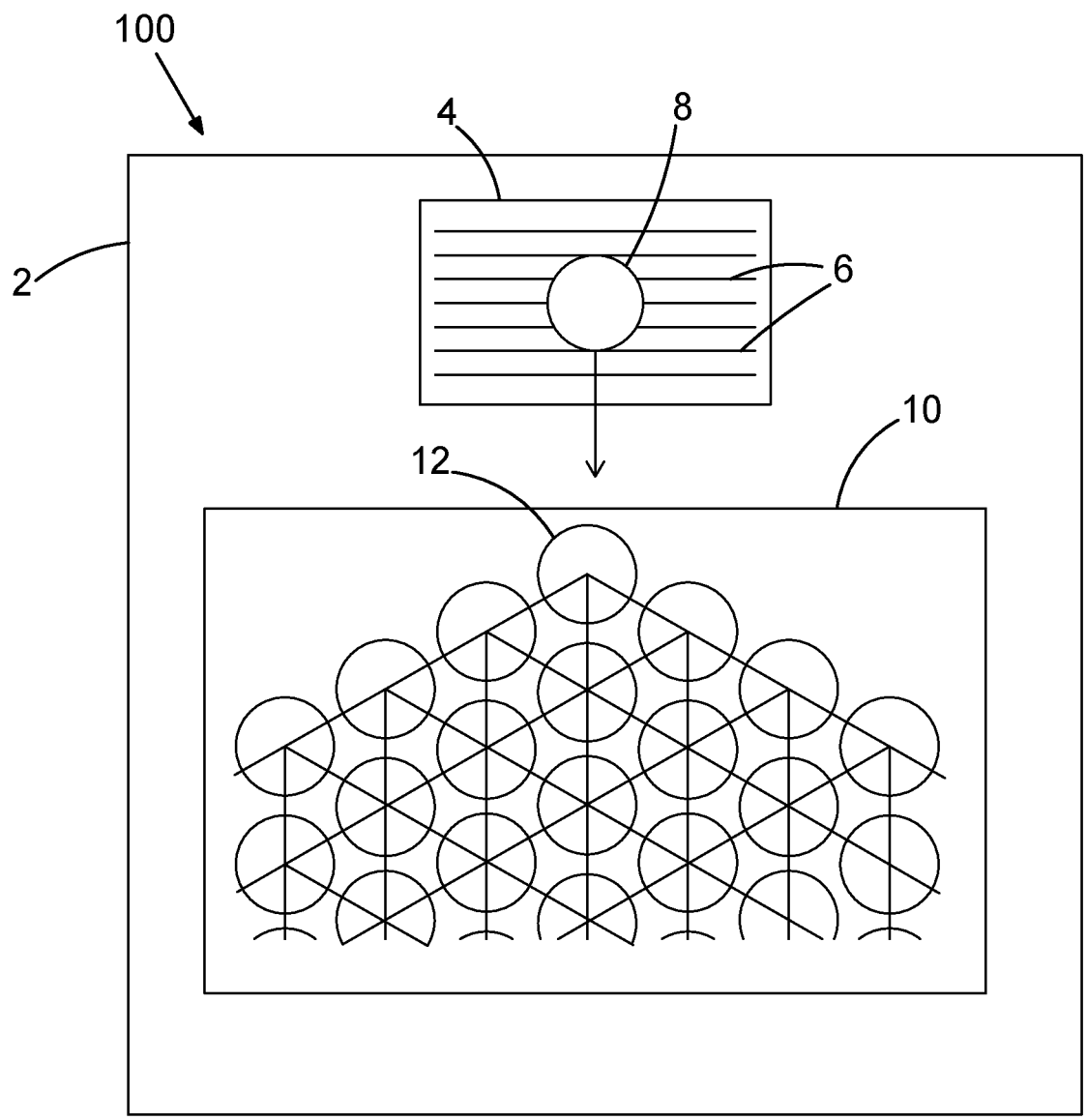
FIG. 1 is schematic face-on view of a prior art waveguide projection display.
Figure 2A:
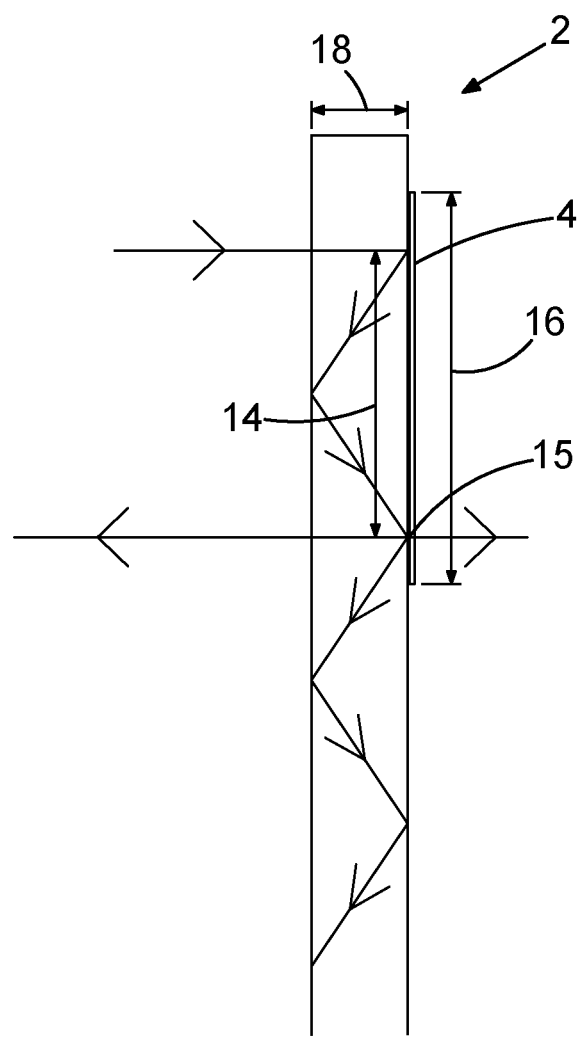
FIGS. 2A and 2B are schematic side-on cross-section views of a prior art waveguide projection display.
Figure 2B:
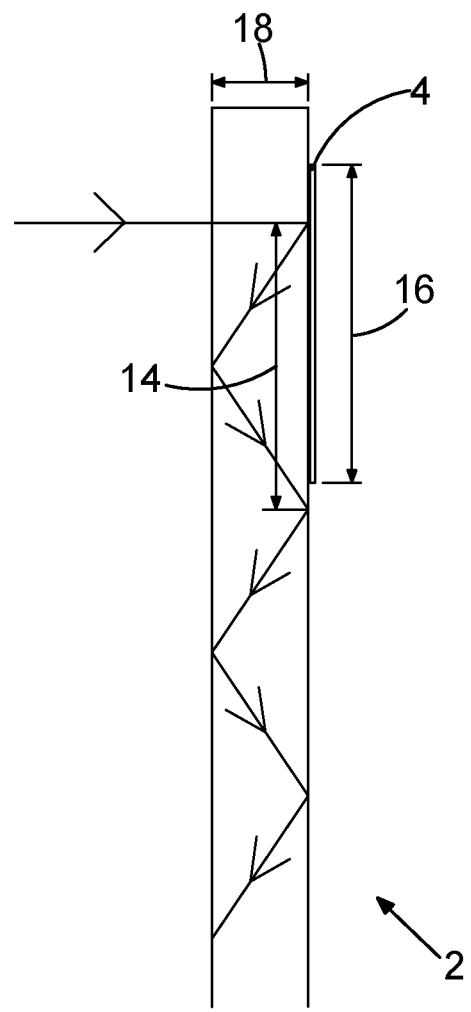

Light generated from the illuminator (not shown) creates an input pupil 8 at the input grating. The illuminator's light source is an array of LEDs. As can be seen the input pupil 8 has a shape that is larger in the direction parallel to the linear diffractive features 6 of the input grating 4 (indicated by reference a), than in a direction perpendicular to the linear diffractive features 6 of the input grating 4 (indicated by reference b). This is longer in the across track than along track direction. In the example shown in FIG. 3A the input pupil 8 has a rectangular shape. However, any shape that is longer parallel to the linear diffractive features than perpendicular to the linear diffractive features could be used. Conventional input pupils are circular as shown in FIG. 1. Reinteraction of the light with the input pupil is avoided by keeping the size of the input pupil 8 small in the direction perpendicular to the linear diffractive features. However, having a large input pupil 8 in the direction parallel to the linear diffractive features 6 ensures that the overall size of the input pupil 8 is not too small, avoiding the issues experienced by having a banded output through having too small a pupil.

After the light has been diffracted by the input grating 4, it is reflected towards the output grating 10 through a series of total internal reflections. Once at the output grating 10 the light diffracts causing replications of the input pupil as output pupil 12 each coupling light out of the waveguide. At each interaction with the output grating some of the light continues to create further replications of the input pupil 12, resulting in the desired image expansion. The path of the light is represented by the lines in FIG. 3A shown on top of the output pupils (as in FIG. 1 for the prior art system).

As can be seen from FIG. 3A the output pupils 12 at the output grating 10 have substantially the same shape as the input pupil 8 at the input grating 4. Advantageously, the rectangular shape of the output pupils 12 shown in FIG. 3A result in a much better overlap of the pupil replications at the output grating 10, than the circular pupil replications of the prior art as shown in FIG. 1. This forms a smoother and more uniform image without banding.

Figure 3B:
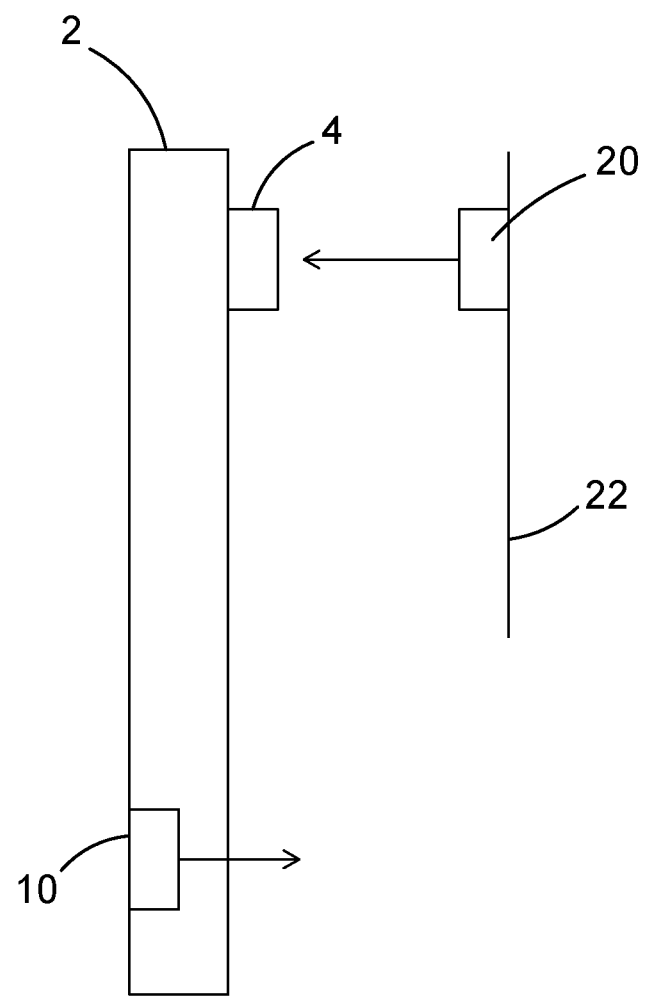
FIG. 3B is schematic face-on view of the waveguide of the projection display as shown in FIG. 3B.

FIG. 3B shows a side-on view of the projection display 200 of FIG. 3A. Waveguide 2 has input grating 4 and output grating 10 as described above. LED array 20 is shown arranged on 2D surface 22. The LED array 20 generates light which is incident on input grating 4 forming the input pupil 8 as described above.

Figure 4:
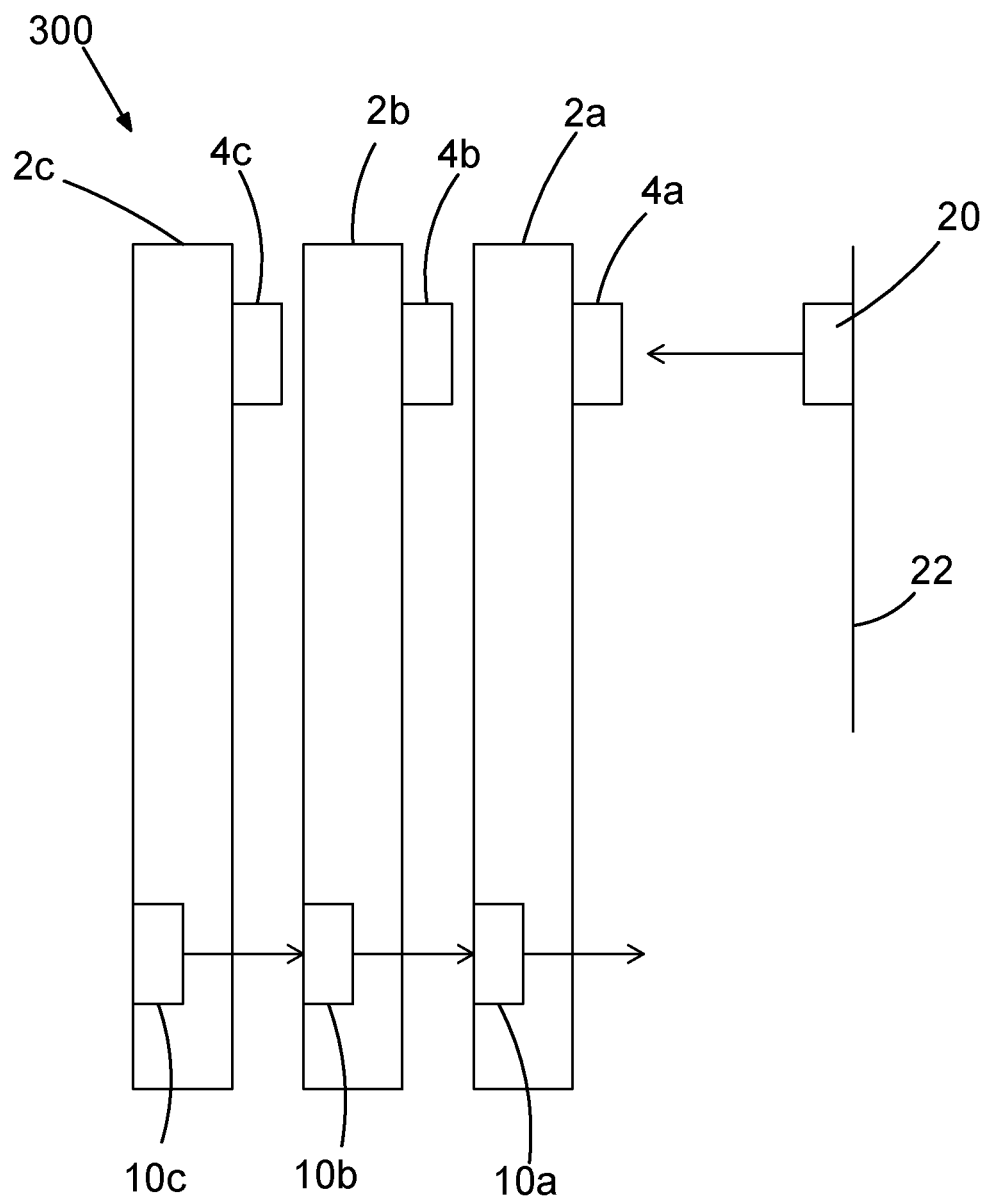
FIG. 4 is a schematic side-on view of a further example projection display according to an embodiment of the invention.

FIG. 4 shows a further example of how the waveguides may be arranged in an example projection display 300 according to the present invention. In this example there are three waveguides 2a 2b and 2c, each having a respective input grating 4a 4b 4c and output grating 10a 10b 10c. In the example shown in FIG. 4 each waveguide is configured to transmit a different colour to each of the other waveguides. Waveguide 2a and its gratings 4a and 10a are configured to transmit blue light, waveguide 2b and its gratings 4b and 10b are configured to transmit green light, and waveguide 2c and its gratings 4c and 10c are configured to transmit red light. In this arrangement, LED array 20 transmits light in red, green and blue.

The LED array 20 is configured to transmit light onto the input grating of each of the waveguides 2a 2b and 2c to form an input pupil 8 having the shape as described above in relation to FIG. 3A.

Figure 5:
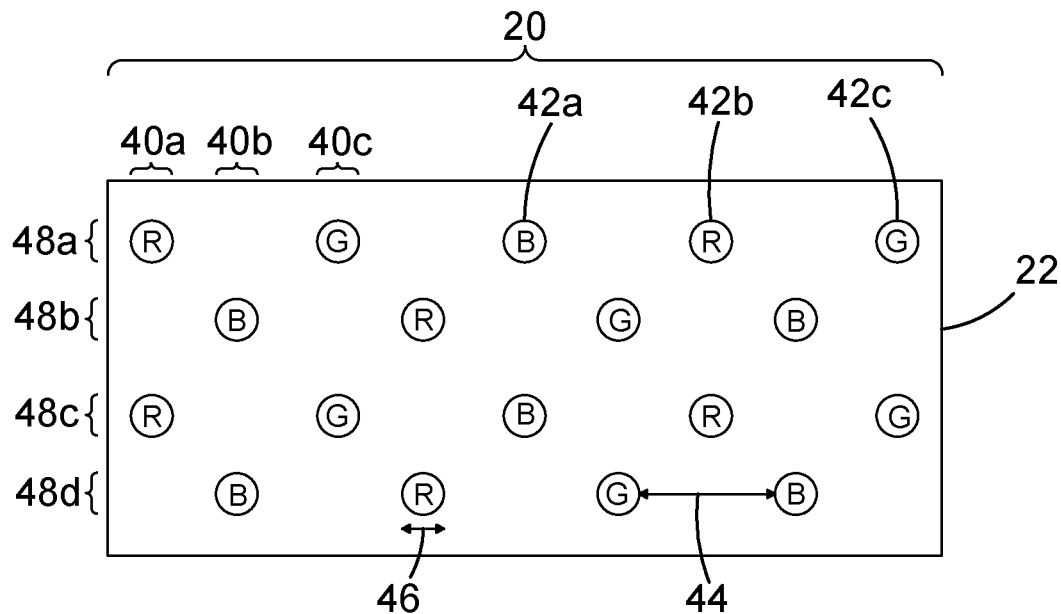
FIG. 5 is a schematic view of an example LED array of the projection display according to an embodiment of the invention.

FIG. 5 shows an example layout of the array of LEDs 20 shown in the arrangements in FIGS. 3B and 4.

The array of LEDs 20 is shown arranged on surface 22. FIG. 5 just shows an example portion of the surface 22 and, the surface 22 may contain hundreds of LEDs in a repeating pattern. This rectangular arrangement of the array of LEDs forms the input pupil with its desired rectangular shape.

It can be seen that the LED array 20 is arranged in rows 48a 48b, 48c and 48d, and columns 40a, 40b, 40c. The LEDs in row 48b are offset from the LEDs in rows 48a and 48c. Likewise each column 42b is also offset with respect to adjacent columns 42a 42c. This regular repeating pattern would expand across the surface 22 such that the LEDs are closely packed.

The distance between each LED, otherwise known as the pitch, is shown by arrow 44. The pitch is larger than the size of each individual LED indicated by arrow 46. This space between LEDs may be provided to accommodate optics that couples the light from the LEDs, such as light pipes.

The letters "R" "B" and "G" on the LEDs 42a 42b 42c indicate the colour of the LEDs 42a 42b 42c. The LEDs of different colours are distributed across the LED array 20.

As discussed above, the shape of the input pupil 8 formed at the input grating 4 of the waveguide 2 is larger in the direction parallel to the linear diffractive features 6 of the input grating 4 than in the direction perpendicular to the linear diffractive features 6.

The input pupil is the relayed image of the illumination pupil. The LED array can be arranged spatially to match the input grating dimensions. In addition, anamorphic optics can also be used to change the proportions of the LED array to match to the shape desired at the input grating.

Figure 6:
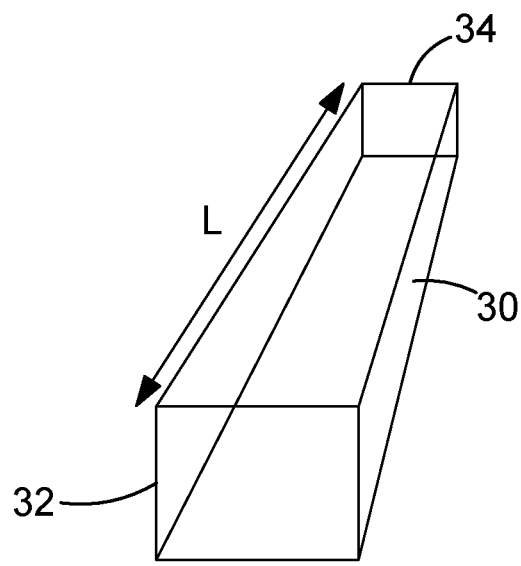
FIG. 6 is a perspective view of a tapered light pipe for use in the projection display according to an embodiment of the invention.

An alternative or additional way to ensure that the input pupil 8 has the desired shape is through the use of light pipes. An example light pipe is shown in FIG. 6. As can be seen the tapered light pipe 30 comprise a first end 34 and a second end 32, the light pipe 30 extending along its length L between the first 34 and second ends 32. As can be seen, the area of the first end 34 is smaller than the area of the second end 32, the length L of the light pipe 30 tapering between the two ends. The first end 34 of the light pipe 30 covers the output of an LED such that the greatest proportion of the light emitted from the LED enters the light pipe 30.

As can be seen, the cross section of the first and second ends 32 34 are such that when the light exits the light pipe 30 it has a profile that matches the cross sectional shape of the second end 32 of the light pipe. In this case this is rectangular. This means that the shape of the beam of light exiting the light pipe 30 can form an input pupil 8 when incident on the input grating that is larger in the direction parallel to the linear diffractive features of the input grating than in the direction perpendicular to the linear diffractive features 6.

Figure 7:
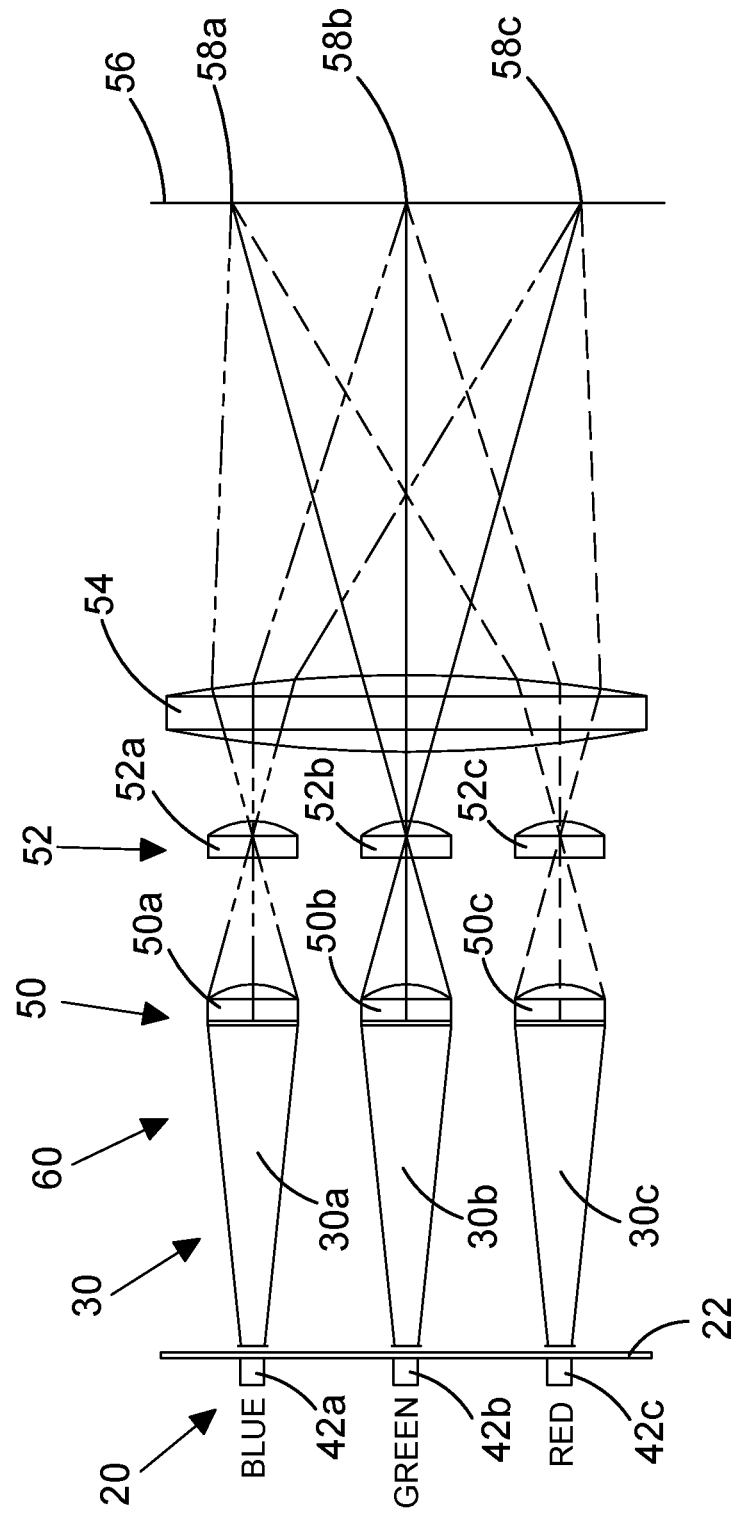
FIG. 7 is a schematic view of an example illuminator of the projection display in an embodiment of the invention.

FIG. 7 shows an example illuminator portion 60 of the projection display of the present invention. The illuminator portion 60 includes an LED array 20, a tapered light pipe array 30, a collimating microlens array 50, a field microlens array 52, and a relay lens 54.

The LED array is arranged on printed circuit board surface 22; having each of the LEDs 42a 42b and 42c arranged on said surface 22.

FIG. 7 also shows LCOS panel 56 which the illuminator 30 is used to illuminate. It can be understood that any type of non-emissive panel could be used. The light from the LCOS panel is then reflected onto the input grating 4 of the waveguide 2, as described above.

Each of the LEDs 42a 42b 42c is coupled to a respective tapered light pipe 30a 30b 30c and a respective field 50a 50b 50c and collimating 52a 52b 52c microlens.

The LED array 20 comprises red, green and blue LEDs. For simplicity only a single LED of each colour LED is shown in FIG. 7. However, the LED array 20 includes many LEDs of each colour. The LED array 20 may include several hundred LEDs arranged on panel 22. For instance, the LED array 20 may have 400 LEDs.

Each tapered light pipe 30a 30b 30c is arranged in close proximity to its corresponding LED 42a 42b 42c such that the light emitted by the LEDs 42a 42b 42c is collected into the light pipe 30. Typically over 90% of the light emitted from each LED 42a 42b 42c is collected by its respective light pipe 30a 30b 30c.

Each light pipe 30a 30b 30c is tapered such that the end closest to the LEDs 42a 42b 42c is smaller than the end furthest from the LEDs 42a 42b 42c, as will be discussed below. Each of the tapered light pipes 30a 30b 30c is a solid pipe of transparent material.

Looking at LED 42*a* and its corresponding light pipe 30*a*, once received in the light pipe 30*a*, the light emitted from the LED 42*a* is totally internally reflected by the light pipe 30*a* as it travels through the light pipe down its length. Each time the light is totally internally reflected, the angle of the light is decreased. Due to the tapered nature of the light pipe 30*a*, once the light exits the light pipe 30*a*, the beam of the light has enlarged, whilst the angle of the beam has reduced.

The light that exits the light pipe 30*a* is then incident on a field microlens 50*a*, which improves the uniformity of the beam, imaging the exit pupil of the light pipe 30*a*. The light is then incident on the collimating microlens 52*a* which collimates the light to generate a collimated image of the of the exit aperture of the light pipe 30*a*. This light is then incident on relay lens 54 which projects the light onto the LCOS panel 56, generating and focusing the collimated image of the exit aperture of the light pipe 30*a* onto the panel 56.

Light is projected from each LED 42*a* 42*b* 42*c* through its corresponding light pipe 30*a* 30*b* 30*c*, field microlens 50*a* 50*b* 50*c*, and collimating microlens 52*a* 52*b* 52*c*, as discussed above. For instance, light from LED 42*b* passes through light pipe 30*b*, field microlens 50*b*, collimating microlens 52*b*, then onto relay lens 54, and light from LED 42*c* passes through light pipe 30*c*, field microlens 50*c*, collimating microlens 52*c*, then onto relay 54. The single relay lens 54 projects this light across the LCOS panel 56. Thus, an image of each of the emitting ends (exit apertures) of the light pipes 30*a* 30*b* 30*c* is projected across the entire LCOS panel 56 display, resulting in a superposition of said images, covering the entire area of the panel 56.

This can be seen in FIG. 7 where the light from LED 42*a* and light pipe 30*a* is projected onto the panel at each of points 58*a* 58*b* and 58*c*. Similarly, the light from LED 42*b* and light pipe 30*b* is projected onto the panel at each of points 58*a* 58*b* and 58*c*, as is the light from LED 42*c* and light pipe 30*c*. Thus, the panel 56 is homogeneously illuminated by the array of LEDs 20 and tapered light pipes 30, the superposition of each of the light paths providing the desired intensity at the panel 56. Although FIG. 7 shows the light from each LED being incident on discrete portions of the image (i.e. points 58*a* 58*b* 58*c*), in practice the distance between such points is small enough such that the entire display appears illuminated.

Having an array of LEDs, corresponding light pipes and microlenses allows the volume of the illumination optics to be reduced, allowing an efficient illuminator design in a far smaller volume. This enables a homogenised uniform irradiance on the display with both high efficiency and low volume.

As outlined above, the LEDs may be microLEDs. Miniaturizing this efficient design using micro LEDs means that the length of the illuminator is reduced. However, the overall volume scales linearity with miniaturisation factor. Thus, the illuminator is more compact than if a single light source was to be used. As each light pipe in the light pipe array is imaged across the whole of the display, having an array ensures that the entrance pupil of the projector is filled and sufficient intensity of illumination is achieved. Each typical micro LED may have an area of less than 0.04 mm$^2$.

The colours (R, G, B) shown in FIG. 7 are purely for illustrative purposes and the LEDs 42*a*, 42*b* and 42*c* may be any colour. For instance, they may all be the same colour. For colour sequential illuminators the light from each LED of each colour is emitted at a different point in time. In this colour sequential mode, the light from the LEDs 20 having the same colour will be incident on the panel 56 together in the way as described above.

Figure 8A:
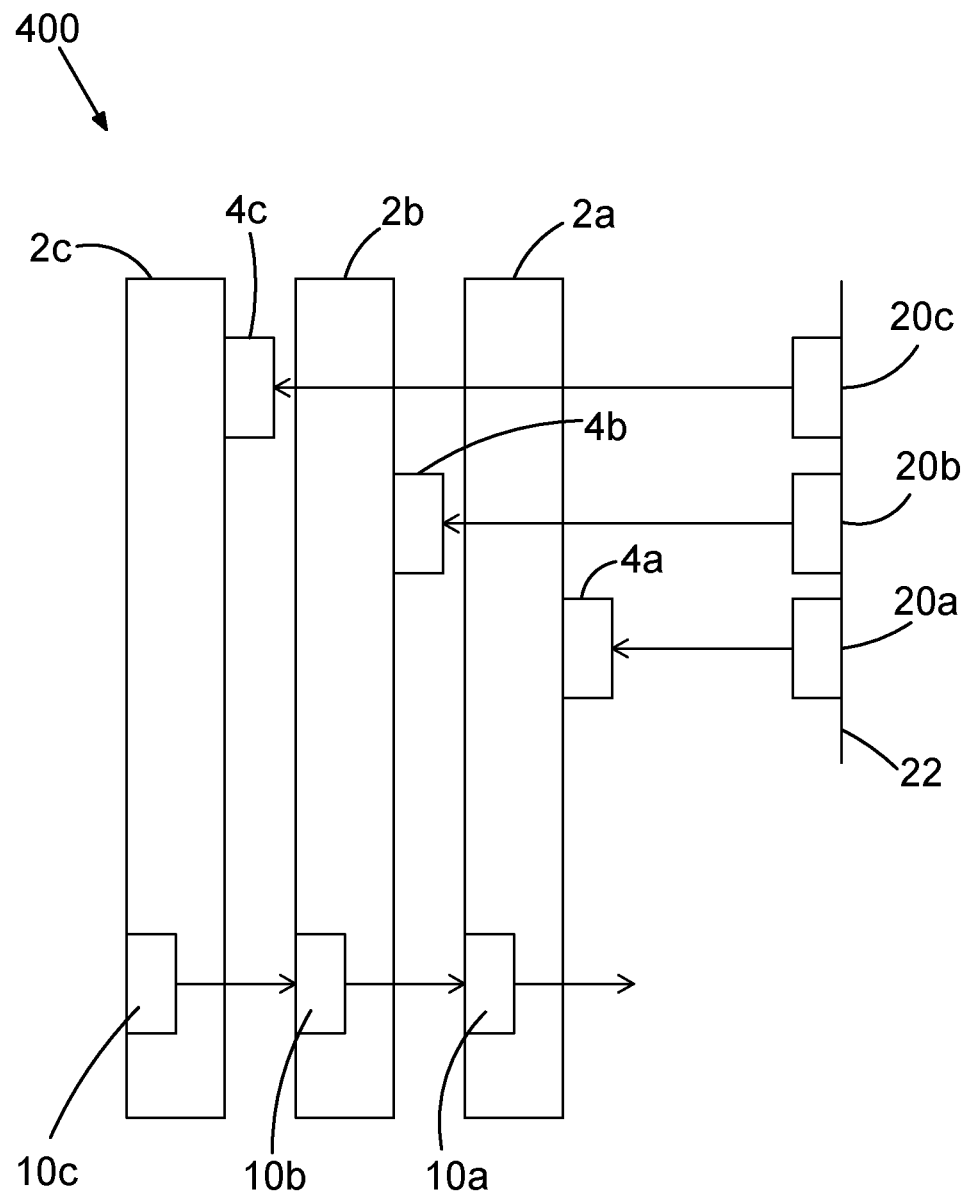
FIG. 8A is a schematic side-on view of the projection display according to a further example embodiment of the invention.
Figure 8B:
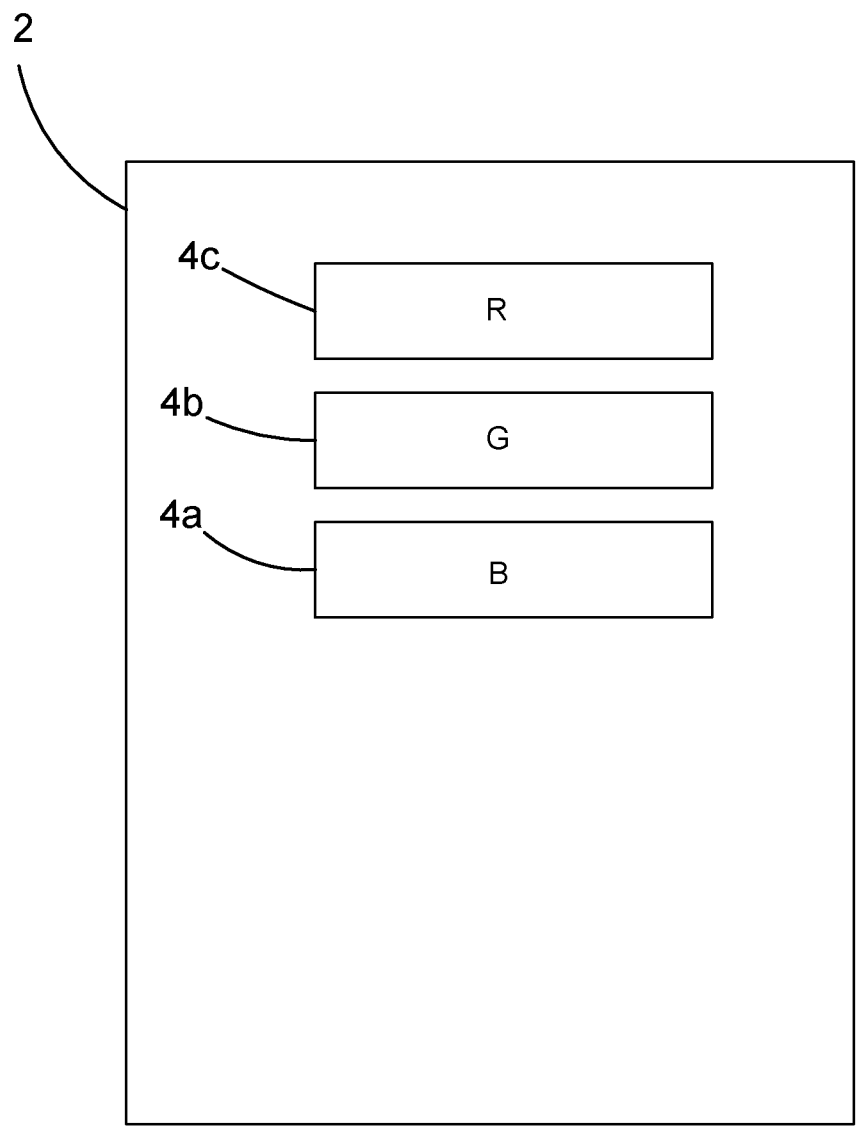
FIG. 8B is a schematic face-on view of the waveguide of the projection display as shown in FIG. 8A.

FIGS. 8A and 8B shows an alternative projection display 400 according to a further example of the present invention. The projection display 400 has three waveguides 2*a* 2*b* and 2*c*, each having a respective input grating 4*a* 4*b* 4*c*. Waveguide 4*a* is configured to propagate blue light, waveguide 4*b* is configured to propagate green light, and waveguide 4*c* is configured to propagate red light.

Projection display 400 also includes three LED arrays. Blue LED array 20*a*, green LED array 20*b*, and red LED array 20*c*. Each of the LED arrays are offset from each other on the panel 22. The offset is in the along track direction, i.e. in the direction that the light propagates in the waveguide between the input grating and the output grating. Each of the arrays of LEDs produces an input pupil at its respective input grating having the shape as described above.

By having this staggered array of LEDs and input gratings splitting of the pupil by colour can be achieved. This arrangement of input gratings means that light of a specific colour is only incident on the grating that is configured to diffract that colour of light. This increases the efficiency of the projector display, as light is not lost by unwanted diffractions with input gratings not configured to diffract that colour of light. For instance, if the input gratings were aligned with one another then the red light would have to pass through input grating 4*b* and input grating 4*a*, which are configured to diffract the green and blue light, respectively. Unwanted diffraction of the red light could occur in either of these gratings 4*a* and 4*b*, thus meaning that some of the red light is lost, reducing the efficiency of the system. A corresponding situation could also occur for the green light with respect to grating 4*a*. By offsetting the input gratings this potential issue is avoided. This may be through offsetting each of the array of LEDs of a specific colour by the same amount as the corresponding input gratings. By each input grating only receiving light of a single colour the input grating need not be transparent to the other colours.

Although the input gratings shown in FIG. 8A (and FIGS. 3B and 4) are shown on the face of the waveguide nearest the array of LEDs, it would be understood that they could alternatively be located on the opposite face of the waveguide. In this alternative arrangement the light has to pass through the waveguide before being diffracted by the input grating. This would allow the input gratings to be metalized. Metalized input gratings do not allow light to pass through the grating, they only allow diffraction of the light. This can further increase the coupling frequency of the input gratings.

In other arrangements, rather than the array of LEDs being offset by the same amount as the offset of the input gratings, additional optics may be provided to ensure that each waveguide only receives light of a single colour.

FIGS. 3A, 4 and 8A show the projector system of the present invention with an array of LEDs transmitting light directly onto the input grating of the waveguide. It will be understood that this may be a simplified arrangement and other optics may be between the LEDs and the waveguide. One such arrangement may be the arrangement shown in FIG. 7. However, other arrangements may be used. To generate an image at the output of the waveguide a device for generating an image from the LED light may be required. This may be a LCOS or LCD type projector. The output of this device relays the light from the LED array to form the input pupil having the required shape at the input grating as described above.

By having an array of LEDs 20 and an array of light pipes 30 the length L of each light pipe can be small. This is further enabled by using an array of LEDs where each LED is of a small size, for instance, micro LEDs, as smaller LEDs emit over a smaller area. The size of the LED is directly proportional to the length of the optical path required (i.e. the distance between the LED and the panel 56). Thus, by using a micro LEDs, each of which has a ¹/₂₀ the size of a traditional light source, this enables the optical path to be reduced by ¹/₂₀. This provides an enhanced saving in volume of up to 95%. For instance, an optical path that is traditionally 40 mm long can be reduced to 2 mm.

Due to the reduction in size of the illuminator, the projection display can be a handheld or wearable device. For instance, the projection display may be a virtual reality or augmented reality headset, where size constraints are of paramount importance.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In the above the term colour has been used when referring to the light emitted by the LEDs and transmitted by each waveguide. This refers to the wavelength of the light. There is typically a range of wavelengths associated with a colour.

Alternative arrangements may be used to create the desired shape of input pupil, not just the shape of the light pipe. For instance, a range of optics, such as lenses may be used to ensure that the light has the desired shape. Alternatively, the LEDs themselves may have the desired shape such that they emit with the desired shape without the need for additional optics.

Although the light pipe 30 shown is a solid pipe of transparent material, with the beam of light totally internally reflected along the internal length of said pipe, any type of light pipe that causes the beam of light to expand in 2D, whilst reducing the beam angle, may be used. For instance, the tapered light pipe 30 may be made from a hollow pipe with reflective internal sides.

The skilled person would understand that any lens array that provides the function of the relay lens could be used, not just a single lens. For instance, this may involve having a plurality of relay lenses. In addition, although a field microlens array is shown in FIG. 7 the presence of a field microlens array is not essential.

The shape of the end of the light pipes is not limited to being rectangular as shown in the Figures. For instance, the end of the light pipe may be elliptical.

The invention claimed is:

1. A projection display comprising:
a waveguide comprising an input grating having a plurality of linear diffractive features, the input grating being configured to couple light into the waveguide; and
an optical projector configured to form an illumination pupil which is optically relayed as an input pupil onto the input grating, at the input grating the input pupil having a shape that is larger in a direction parallel to the linear diffractive features than in a direction perpendicular to the linear diffractive features.

2. The projection display of claim 1, wherein:
the optical projector comprises a liquid crystal on silicon (LCOS) display.

3. The projection display of claim 2, wherein:
the optical projector further comprises one or more LEDs; and
the LCOS display is positioned between the one or more LEDs and the waveguide.

4. The projection display of claim 3, further comprising:
a tapered light pipe array, positioned between the one or more LEDs and the waveguide, wherein the tapered light pipe array is configured to receive light from the one or more LEDs before being optically relayed as the input pupil on the input grating.

5. The projection display of claim 4, wherein each LED of the one or more LEDs has a respective tapered light pipe.

6. The projection display of claim 5, wherein an end of each tapered light pipe has a shape that is the same as the shape of the input pupil.

7. The projection display of claim 1, wherein:
the waveguide has a width;
the input grating has a length; and
the shape of the input pupil is selected dependent on the width of the waveguide and the length of the input grating, such that the light only has a single interaction with the input grating.

8. The projection display of claim 1, further comprising a plurality of arrays of LEDs, each array of LEDs comprising one or more LEDs emitting light of a specific color.

9. The projection display of claim 8, wherein the waveguide comprises a plurality of waveguides, the input grating of each waveguide being configured to couple in light of a different color to the input gratings of each other waveguide of the plurality of waveguides.

10. The projection display of claim 9, wherein the plurality of arrays of LEDs are arranged on a 2D surface, each array of LEDs being offset from each other array of LEDs on said 2D surface.

11. The projection display of claim 10, wherein the input grating of each waveguide is offset from the input gratings of each of the other waveguides, such that only light of a single color is incident on each input grating.

12. The projection display of claim 3, wherein the one or more LEDs are arranged on a 2D surface to form a spatial arrangement, and wherein a shape of the spatial arrangement of the one or more LEDs is the same as the shape of the input pupil.

13. The projection display of claim 1, wherein the shape of the input pupil is elliptical or rectangular.

14. The projection display of claim 1, wherein the waveguide further comprises an output grating, the output grating being configured to receive light from the input grating and replicate the input pupil multiple times, to form an exit pupil coupling the light out of the waveguide.

15. The projection display of claim 3, wherein the one or more LEDs are an array of microLEDs.

16. The projection display of claim 1, further comprising an augmented reality or virtual reality device.

17. A method of illuminating a projection display comprising:
emitting light from an optical projector to form an illumination pupil;
optically relaying the illumination pupil as an input pupil onto an input grating of a waveguide, the input grating comprising a plurality of linear diffractive features, to couple the light into the waveguide, such that at the input grating the input pupil has a shape that is larger in a direction parallel to the linear diffractive features of the waveguide than in a direction perpendicular to the linear diffractive features of the waveguide; and projecting the light out of the waveguide to form an image.

18. The method of claim 17, wherein the shape of the input pupil is elliptical or rectangular.

19. The method of claim 17, wherein projecting light out of the waveguide further comprises:

receiving light from the input grating at an output grating; and replicating, through the output grating, the input pupil multiple times to form an exit pupil coupling the light out of the waveguide.

20. An apparatus comprising:

means for emitting light from an optical projector to form an illumination pupil;

means for optically relaying the illumination pupil as an input pupil onto an input grating of a waveguide, the input grating comprising a plurality of linear diffractive features, to couple the light into the waveguide, such that at the input grating the input pupil has a shape that is larger in a direction parallel to the linear diffractive features of the waveguide than in a direction perpendicular to the linear diffractive features of the waveguide; and means for projecting the light out of the waveguide to form an image.

\* \* \* \* \*